(12) United States Patent
Vasko et al.

(10) Patent No.: US 8,282,145 B2
(45) Date of Patent: Oct. 9, 2012

(54) GAP HIDER FOR AN INTERIOR VEHICLE PANEL ASSEMBLY

(75) Inventors: Melaina Vasko, Highland Township, MI (US); Michael Eberlein, Plymouth, MI (US); Thomas Mally, Beverly Hills, MI (US); Douglas Dawe, Milford, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/020,310

(22) Filed: Feb. 3, 2011

(65) Prior Publication Data

US 2012/0200117 A1 Aug. 9, 2012

(51) Int. Cl.
*B60R 13/00* (2006.01)

(52) U.S. Cl. ...... 296/24.34; 296/70; 296/39.1; 296/1.08

(58) Field of Classification Search ............... 296/70, 296/24.34, 37.8, 39.1–39.3, 1.08
See application file for complete search history.

(56) References Cited

U.S. PATENT DOCUMENTS

| | | | | |
|---|---|---|---|---|
| 4,741,945 A * | 5/1988 | Brant et al. | ............ | 428/158 |
| 6,318,783 B1 * | 11/2001 | Knox | ............ | 296/39.1 |
| 6,921,118 B2 * | 7/2005 | Clark et al. | ............ | 296/24.34 |
| 7,631,917 B2 * | 12/2009 | Kwolek | ............ | 296/24.34 |
| 7,654,558 B2 * | 2/2010 | Choi | ............ | 280/728.2 |
| 7,695,039 B2 * | 4/2010 | Sakamoto | ............ | 296/1.08 |
| 7,766,370 B2 * | 8/2010 | Putcha | ............ | 280/728.3 |
| 8,151,536 B2 * | 4/2012 | Stachura et al. | ............ | 52/716.5 |
| 2007/0126215 A1 * | 6/2007 | Choi | ............ | 280/730.2 |
| 2008/0001422 A1 * | 1/2008 | Kwolek | ............ | 296/24.34 |
| 2011/0187144 A1 * | 8/2011 | Kwolek | ............ | 296/37.8 |
| 2012/0001445 A1 * | 1/2012 | Hajiri et al. | ............ | 296/1.08 |

FOREIGN PATENT DOCUMENTS

JP 05345538 A * 12/1993

OTHER PUBLICATIONS

Photocopy of 2010 Nissan Maxima Instrument Panel Skirt (pp. 1 and 2).

* cited by examiner

*Primary Examiner* — Dennis Pedder
(74) *Attorney, Agent, or Firm* — Young, Basile, Hanlon & MacFarlane, P.C.

(57) ABSTRACT

Embodiments of interior vehicle panel assemblies are disclosed herein. One embodiment disclosed herein comprises a first panel having an exterior surface, an interior surface and a first edge and a second panel having an exterior surface, an interior surface and a second edge. The second edge of the second panel is aligned with the first edge of the first panel to define a gap having a height between the first edge of the first panel and the second edge of the second panel. A projection extends from one of the first and second panels in a position inward from the exterior surface and toward the respective edge of other of the first and second panels to span at least a portion of the height of the gap.

21 Claims, 8 Drawing Sheets

GAP HIDER FOR AN INTERIOR VEHICLE PANEL ASSEMBLY

TECHNICAL FIELD

The present invention relates in general to an interior vehicle panel assembly and in particular to an assembly that hides a gap formed between two panels.

BACKGROUND

Interior vehicle panel assemblies with adjacent panels form at least a portion of vehicle interiors and are typically of a shape and size that are determined by the vehicle design and styling. Some interior vehicle panel assemblies can be designed such that one of the adjacent panels extends under the other panel so that the panels overlap. Other interior vehicle panel assemblies can have the adjacent panels be attached directly to one another to appear as a continuous one-piece panel. Other interior vehicle panel assemblies can require that adjacent panels not be directly attached to one another or overlapped. The adjacent panels can be attached to different components within the vehicle. Tolerances due to manufacturing, for example, can create a gap between the adjacent panels. This gap may decrease perceived quality of the vehicle.

SUMMARY

Embodiments of interior vehicle panel assemblies are disclosed herein. One embodiment disclosed herein comprises a first panel having an exterior surface, an interior surface and a first edge and a second panel having an exterior surface, an interior surface and a second edge. The second edge of the second panel is aligned with the first edge of the first panel to define a gap having a height between the first edge of the first panel and the second edge of the second panel. A projection extends from one of the first and second panels in a position inward from the exterior surface and toward the respective edge of other of the first and second panels to span at least a portion of the height of the gap.

Another embodiment of an interior vehicle panel assembly disclosed herein comprises an instrument panel having a center instrument panel wall and opposing lateral instrument panel walls extending substantially perpendicular from the center instrument panel wall, the opposing lateral instrument panel walls each having a lower edge, and a console having a center console wall and opposing lateral console walls extending substantially perpendicular from the center console wall, the opposing lateral console walls each having an upper edge. The upper edges of the console are aligned with the lower edges of the instrument panel to define a gap having a height between the corresponding lower edges and the upper edges. A projection has a first section extending from one of the opposing lateral instrument panel walls or one of the opposing lateral console walls, and a second section extending from another of the opposing lateral instrument panel walls or another of the opposing lateral console walls. The first and second sections of the projection are configured to span at least a portion of the height of the gap.

Yet another embodiment of an interior vehicle panel assembly disclosed herein comprises an instrument panel having an exterior surface, an interior surface and a lower edge and a console having an exterior surface, an interior surface and an upper edge. The upper edge of the console is aligned with the lower edge of the instrument panel to define a gap having a height between the lower edge of the instrument panel and the upper edge of the console. A projection extends from the console at a position inward from the exterior surface of the console and extends toward the upper edge of the instrument panel to span at least a portion of the height of the gap.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
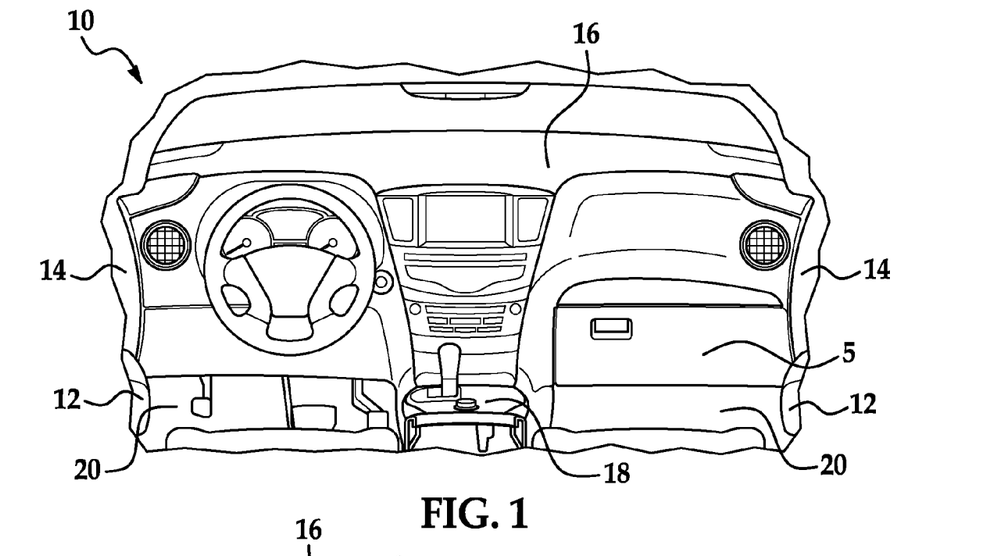
FIG. 1 is a partial view of a passenger compartment of a vehicle.

FIG. 1 is a partial view of a passenger compartment 5 of a vehicle 10. The passenger compartment 5 of the vehicle 10 is formed, in part, with various panels, such as door panels 12, 14, instrument panel 16, console 18 and floor panels 20. The panels define a cavity 22 within which vehicle operating components are housed outside of view by the passengers of the vehicle 10. Embodiments of interior vehicle panel assemblies are disclosed which can enclose this cavity 22 and prevent a vehicle passenger from viewing the components when in the passenger compartment 5.

Embodiments of interior vehicle panel assemblies can comprise a first panel having an exterior surface, an interior surface and a first edge and a second panel having an exterior surface, an interior surface and a second edge. The exterior surface is the surface viewed from within the passenger compartment 5 of the vehicle 10. The interior surface faces the cavity 22 housing the components. The second edge of the second panel is aligned with the first edge of the first panel to define a gap having a height between the first edge of the first panel and the second edge of the second panel. A projection extends from one of the first and second panels in a position inward from the exterior surface and toward the respective edge of the other of the first and second panels to span at least a portion of the height of the gap.

Figure 2:
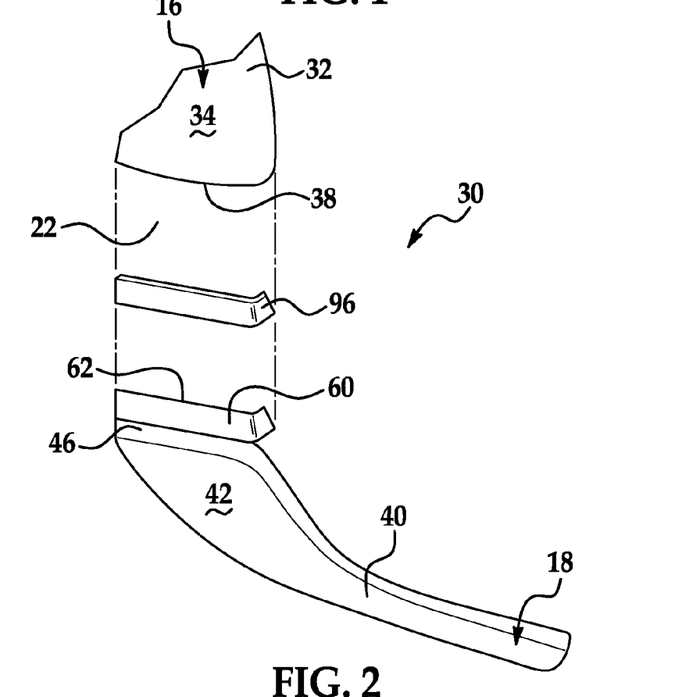
FIG. 2 is an exploded view of an interior vehicle panel assembly disclosed herein.
Figure 3:
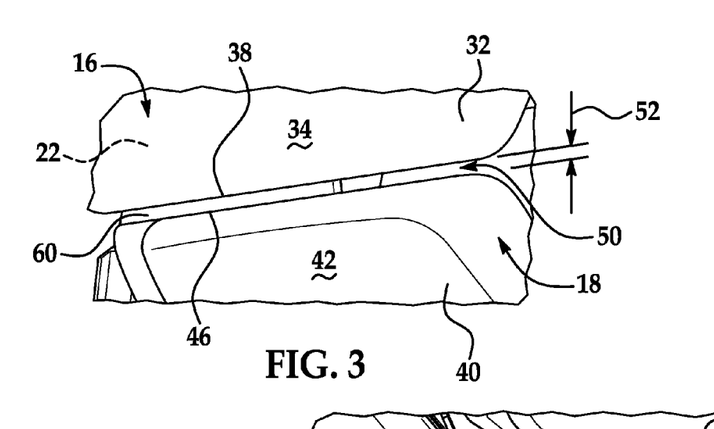
FIG. 3 is an enlarged side view of the interior vehicle panel assembly of FIG. 2.
Figures 4, 5:
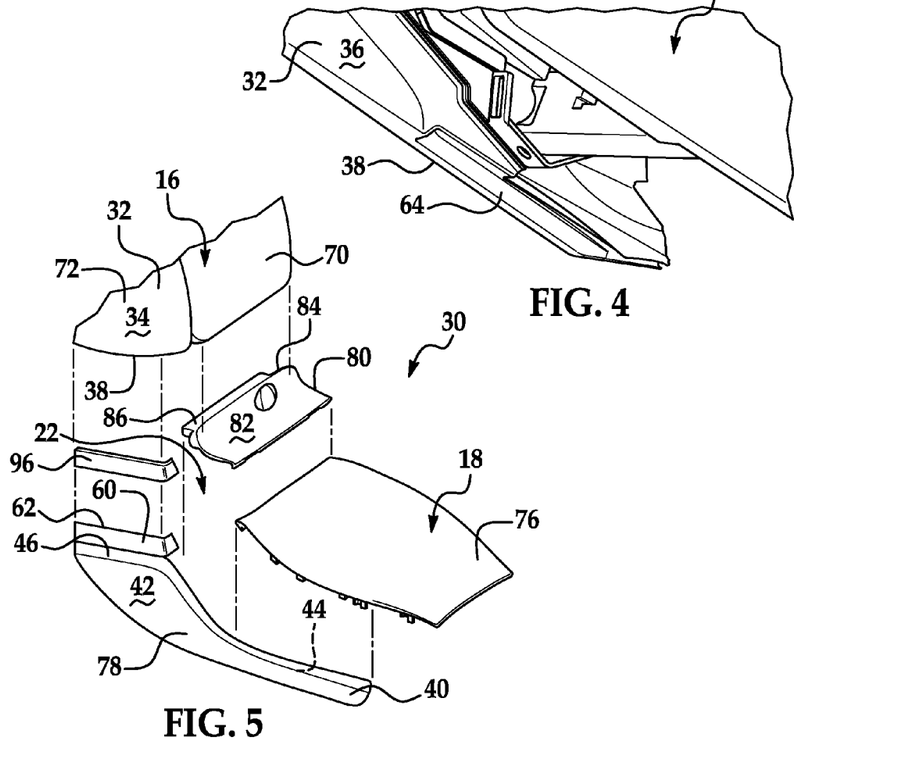
FIG. 4 is a perspective view of a recess of the interior vehicle panel assembly disclosed herein.
FIG. 5 is an exploded view of another interior vehicle panel assembly disclosed herein.

One embodiment of an interior vehicle panel assembly 30 is shown in FIGS. 2-4. The interior vehicle panel assembly 30 will be illustrated with the first panel 32 being part of an instrument panel 16 and the second panel 40 being part of a vehicle console 18. The instrument panel and console are used as an example and are not meant to be limiting. Interior vehicle panel assemblies can comprise any two adjacent vehicle body panels.

FIG. 2 is an exploded view of the interior vehicle panel assembly 30. The first panel 32 of the interior vehicle panel assembly 30 has an exterior surface 34, an interior surface 36 and a first edge 38. The second panel 40 has an exterior surface 42, an interior surface 44 and a second edge 46. The second edge 46 of the second panel 40 is aligned with the first edge 38 of the first panel 32 when installed to define a gap 50 having a height 52 between the first edge 38 of the first panel 32 and the second edge 46 of the second panel 40. The gap 50 is shown in FIG. 3. A projection 60 extends from one of the first and second panels 32, 40 in a position inward from the exterior surface 34, 42 and toward the respective edge 38, 46 of the other of the first and second panels 32, 40 to span at least a portion of the height 52 of the gap 50. Alternatively, the projection 60 can extend the full height 52 of the gap 50 or beyond the height 52 of the gap 50.

For illustrative purposes, the projection 60 is shown extending from the second panel 40. The projection 60 can be integrally formed with the panel 32, 40 from which it extends. For example, the panel 32, 40 and the projection 60 can be formed together in the same mold. Alternatively, the projection 60 can be a separate component that is attached to the panel 32, 40 by any means known to those skilled in the art, such as with welds or fasteners.

The projection 60 has a free distal edge 62, shown in FIG. 2, extending at least the height 52 of the gap 50 such that only the projection 60 is visible through the gap 50. The free distal edge 62 can extend from the interior surface 36, 44 of one of the first and second panels 32, 40 and into the cavity 22. The free distal edge 62 can alternatively extend into a recess 64 provided on the other interior surface 36, 44 of the other of the first or second panels 32, 40 at the first or second edge 38, 46. The recess 64 is shown provided on the interior surface 36 of the first panel 32 in FIG. 4. The recess 64 can be configured to receive an entire width of the projection 60, or the recess 64 can be configured to receive only a portion of the width of the projection 60, with the remainder of the width extending into the cavity 22. The recess 64 can be formed in the interior surface 44 of the second panel 40 if the projection 60 extends from the first panel 32.

Another embodiment of the interior vehicle panel assembly is illustrated in FIGS. 5-10, with similar components using the same reference numbers for clarity. The first panel 32 is an instrument panel 16 comprising a first instrument panel wall 70 and a second instrument panel wall 72 extending in a substantially perpendicular plane from the first instrument panel wall 70. The second instrument panel wall 72 has the first edge 38. The second panel 40 is a console comprising a first console wall 76 and a second console wall 78 extending in a substantially perpendicular plane from the first console wall 76. The second console wall 78 has the second edge 46, with the first edge 38 and second edge 46 defining the gap 50. The first console wall 76 can comprise a tray panel 80 having an exterior surface 82, an interior surface 84 and a rib 86 extending from the interior surface 84. Alternatively, the tray panel 80 can be omitted with the rib 86 extending directly from an interior surface of the first console wall 76.

Figure 7:
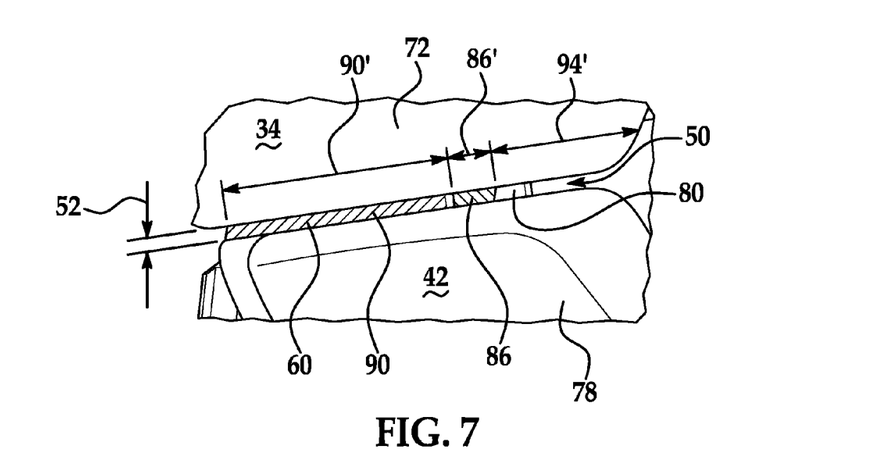
FIG. 7 is an enlarged view of the interior vehicle panel assembly disclosed in FIG. 6.
Figure 8:
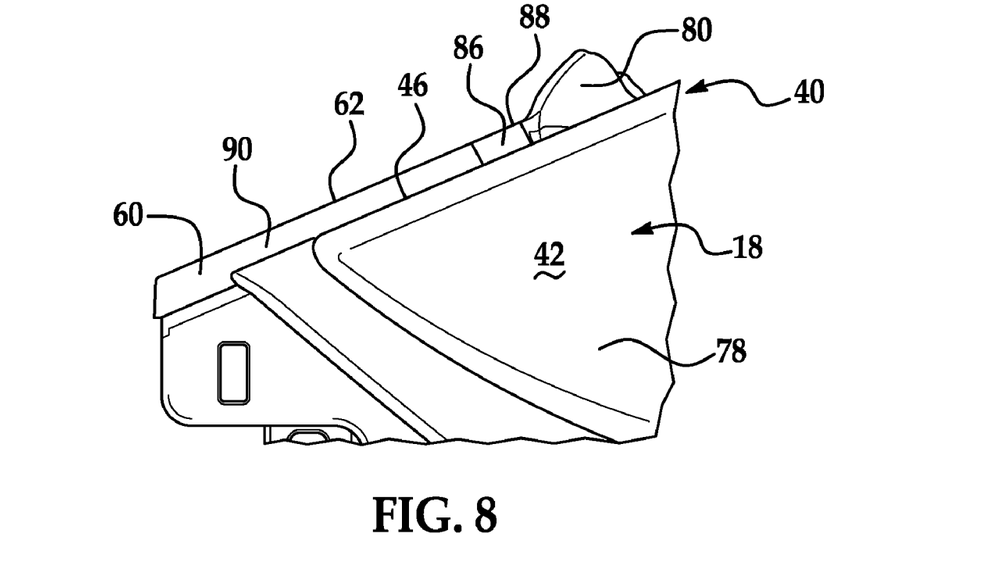
FIG. 8 is a side view of a projection of the interior vehicle panel assembly disclosed herein.

The projection 60 can include a first portion 90 extending along a first portion 90' of a length of the gap 50 and a second portion 92 extending at an angle α from the first portion 90 toward the rib 86 of the tray panel 80. The second portion 92 can extend along a second portion 92' of the gap 50 with the rib 86 extending along a third portion 86' of the gap 50 such that only the first portion 90, the second portion 92, and the rib 86 are visible through the gap 50. FIG. 7 is an enlarged side view of the interior panel assembly 30. In this view, only the first portion 90 of the projection 60 and the rib 86, extending along the first portion 90' and the third portion 86' of the gap 50 are visible. FIG. 8 illustrates the same view of the projection 60.

As best seen in FIG. 7, the gap 50 can have a fourth portion 94' that extends toward the rear of the vehicle 10 from the cavity 22. The fourth portion 94' of the gap 50 is not concealed with a portion of projection 60 as the fourth portion 94' extends beyond the face of the tray portion 80 so that the passenger compartment 5 is visible through the fourth portion 94' of the gap 50 rather than components within the cavity 22.

Figure 6:
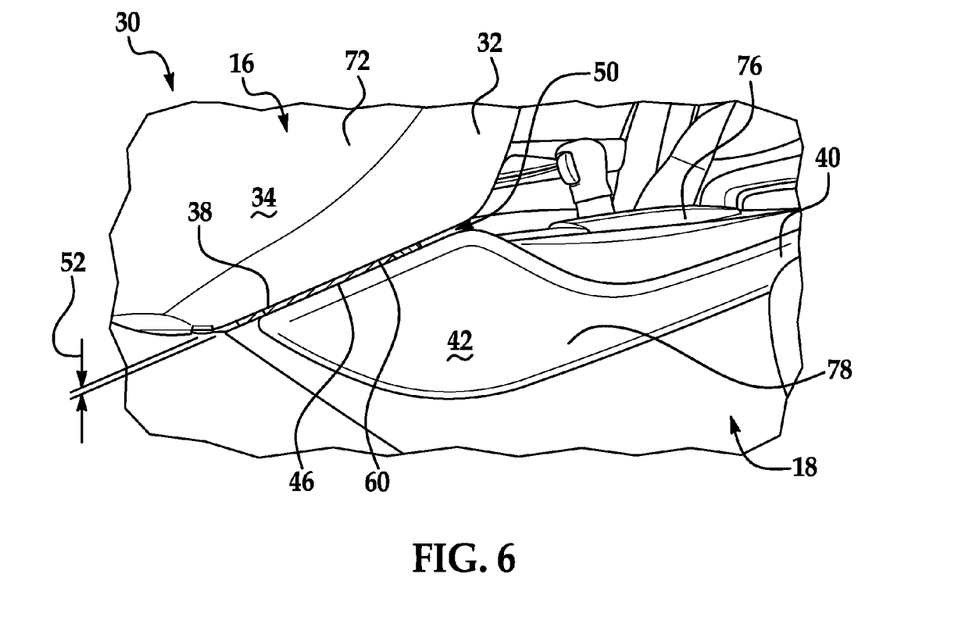
FIG. 6 is a side view of the interior vehicle panel assembly disclosed in FIG. 5.
Figure 9:
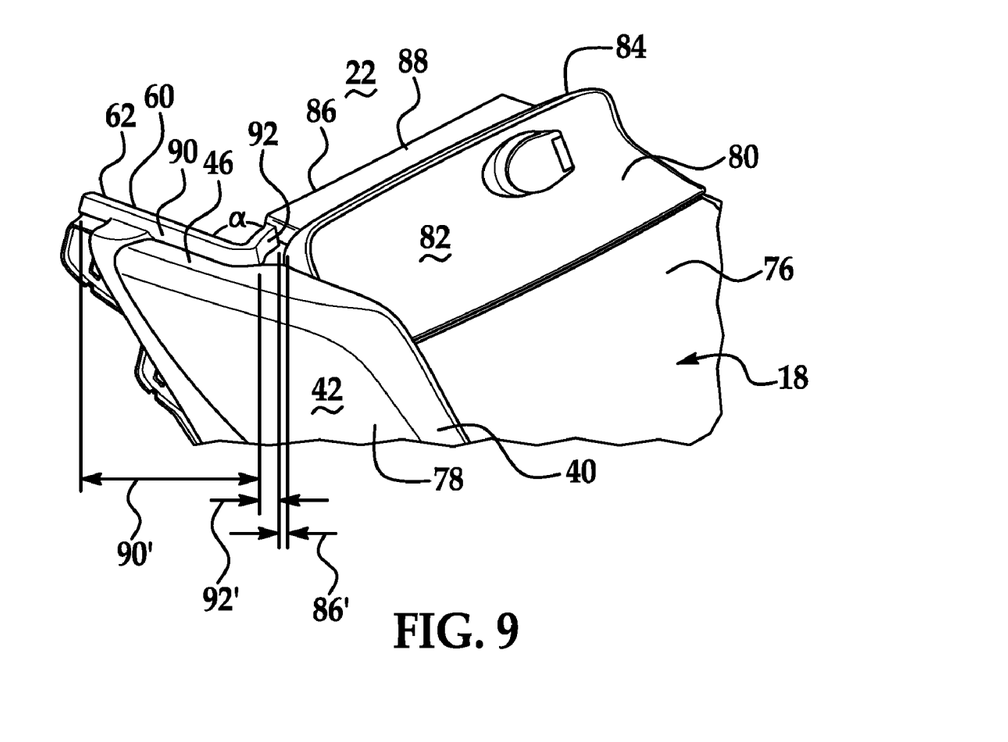
FIG. 9 is a perspective view of the projection of FIG. 8.
Figure 10:
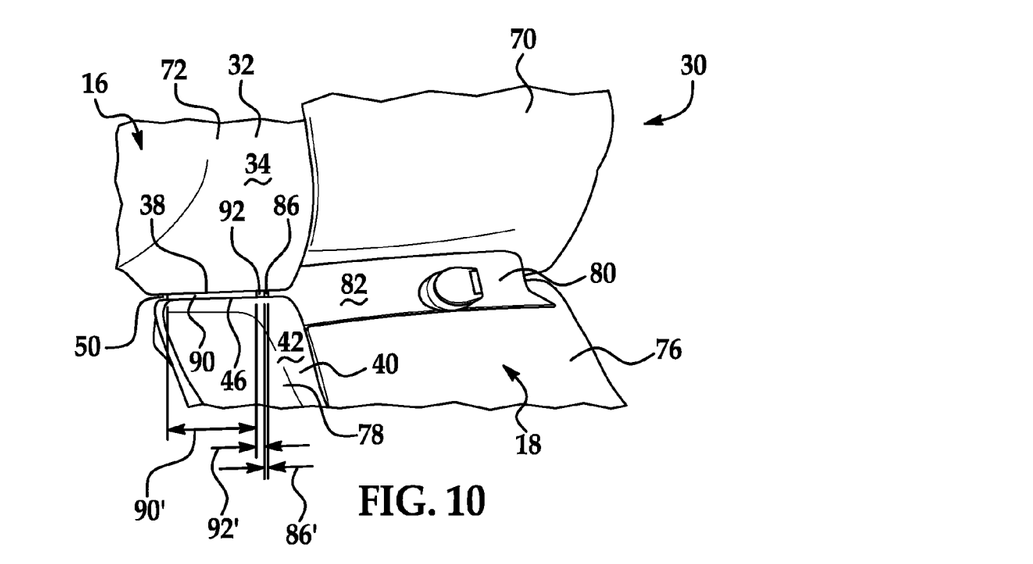
FIG. 10 is an enlarged perspective view of the interior vehicle panel assembly of FIGS. 5 and 6.
Figure 11:
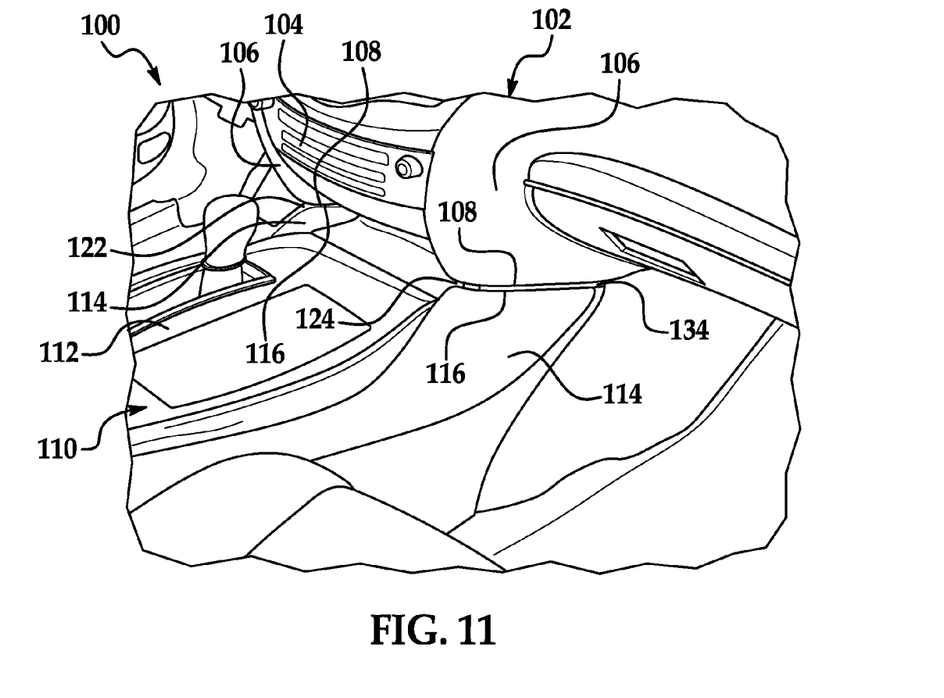
FIG. 11 is a perspective view of another embodiment of an interior vehicle panel assembly disclosed herein.

FIGS. 9 and 10 are perspective views of the projection 60 and interior panel assembly 30 shown in FIGS. 8 and 6 respectively from the driver's seat of the vehicle 10. From this angle, the first portion 90, second portion 92 and rib 86 are clearly shown. The angle α at which the second portion 92 of the projection 60 extends from the first portion 90 is seen in FIG. 9. The angle α shown is illustrative and can be larger or smaller as desired or required.

The rib 86 of the tray panel 80 can span the height 52 of the gap 50 or can extend beyond the height 52 of the gap 50. An upper edge 88 of the rib 86 can be substantially flush with the distal edge 62 of the projection 60, as shown in FIGS. 8 and 9. FIG. 10 illustrates how the first instrument panel wall 70 extends behind the tray panel 80 so that the gap 50 does not continue between the first instrument panel wall 70 and the first console wall 76. Because of this, only a portion of the rib 86 is visible through the gap 50. Accordingly, the rib 86 does not have to extend along the length of the tray panel 80 as shown. The rib 86 also does not have to be a single rib, but can be one or more individual ribs.

Figure 17:
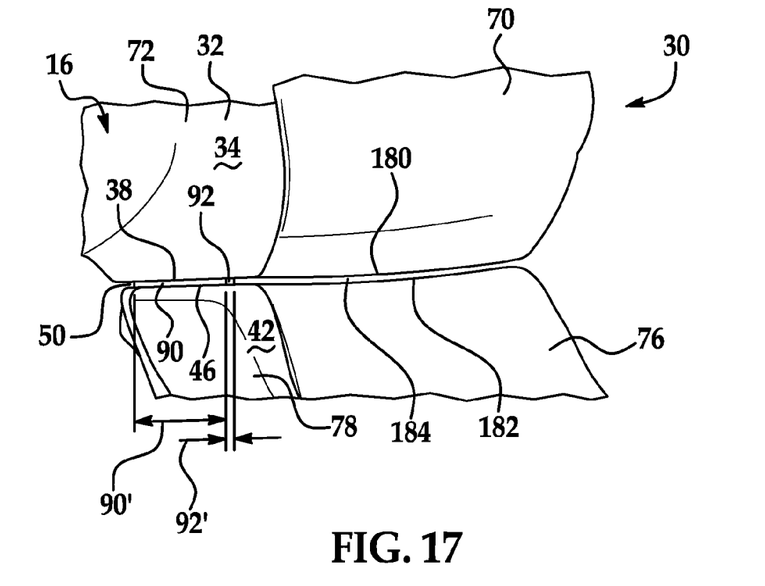
FIG. 17 is an enlarged perspective view of an alternative embodiment of an interior vehicle panel assembly disclosed herein.

Alternatively, as shown in FIG. 17, the first instrument panel wall 70 can have an edge 180 and the first console wall 76 can have an edge 182, the edges 180, 182 defining a gap 184 between them. The rib 86 can extend from the interior surface of the first console wall 76 rather than the interior surface 84 of the tray panel 80. The rib 86 can extend at least a majority of the length of the gap 184 that would be formed between the edges 180, 182 of the first instrument panel wall 70 and the first consol wall 76 respectively. The rib 86 can also span at least a height of the gap 184 that would be formed between the edges 180, 182 of the first instrument panel wall 70 and the first consol wall 76 respectively. It is also within the purview of the embodiments that the projection 60 can extend continuously from first portion 90 to second portion 92 to span the gap 184. The rib 86 would not be necessary to fill any portion of the gaps 50, 184 with a continuous projection. If the tray panel 80 is included in the first console wall 76 as described herein, the edge 182 can be on the tray panel 80. The rib 86 extending from the interior surface 84 of the tray panel 80 can extend at least a majority of the length of the gap 184 that would be formed between the edges 180, 182 of the first instrument panel wall 70 and the tray panel 80 respectively. The rib 86 can also span at least a height of the gap 184 that would be formed between the edges 180, 182 of the first instrument panel wall 70 and the tray panel 80 respectively.

To help achieve a uniform appearance across the gap 50, a rubber layer 96 can cover the first and second portions 90, 92 of the projection 60 and the rib 86. FIGS. 2 and 5 illustrate a rubber layer 96 that overlays the projection 60. The rubber layer 96 can be a material other than rubber, such as foam or plastic and can be a dark uniform color such as black. The rubber layer 96 can also reduce noise due to vibration and contact between the projection 60 and the first instrument panel wall 70, for example. The same covering material 96 can be used as a console tray mat to cover the tray panel 80 as well as the rib 86.

Another embodiment of an interior panel assembly 100 for a vehicle is illustrated in FIGS. 11-16. An instrument panel 102 has a center instrument panel wall 104 and opposing lateral instrument panel walls 106 extending substantially perpendicular from the center instrument panel wall 104. The opposing lateral instrument panel walls 106 each have a lower edge 108. A console 110 has a center console wall 112 and opposing lateral console walls 114 extending substantially perpendicular from the center console wall 112. The opposing lateral console walls 114 each have an upper edge 116. The upper edges 116 of the console 110 are aligned with the lower edges 108 of the instrument panel 102 to define first and second sections 122, 124 of a gap 120, with each section 122, 124 having a height 126 between the corresponding lower edges 108 and the upper edges 116. The instrument panel 102 and console 110 define the cavity 160 within which vehicle operating components are housed. The instrument panel 102 and console 110 are used as an example and are not meant to be limiting. Interior vehicle panel assemblies can comprise any two adjacent vehicle body panels.

A projection 130 has a first section 132 extending from one of the opposing lateral instrument panel walls 106 or one of the opposing lateral console walls 114, and a second section 134 extending from another of the opposing lateral instrument panel walls 106 or another of the opposing lateral console walls 114. The first and second sections 132, 134 of the projection 130 are configured to span at least a portion of the height 126 of corresponding first and section sections 122, 124 of the gap 120. Alternatively, the first and second sections 132, 134 of the projection 130 can extend the full height 126 of the gap 120 or beyond the height 126 of the gap 120. The first section 132 of the projection 130 and the first section 122 of the gap 120 are better seen in FIG. 12.

The first and second sections 132, 134 of the projection 130 are shown extending from the opposing lateral console walls 114 for illustration but can alternatively extend from opposing lateral instrument panel walls 106. The first and second sections 132, 134 can each be integrally formed with its respective lateral console wall 114 or lateral instrument panel wall 106 from which it extends. Alternatively, the first and second sections 132, 134 of the projection 130 can be separate components that are attached to their respective lateral console wall 114 or lateral instrument wall 106 by any means known to those skilled in the art, such as with welds or fasteners.

Figure 13:
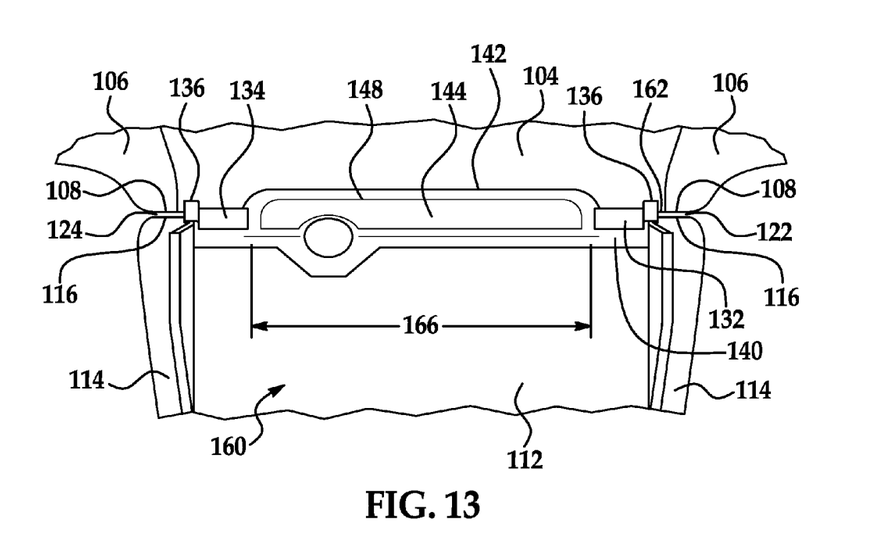
FIG. 13 is an interior view of the interior vehicle panel assembly of FIG. 11.
Figure 14:
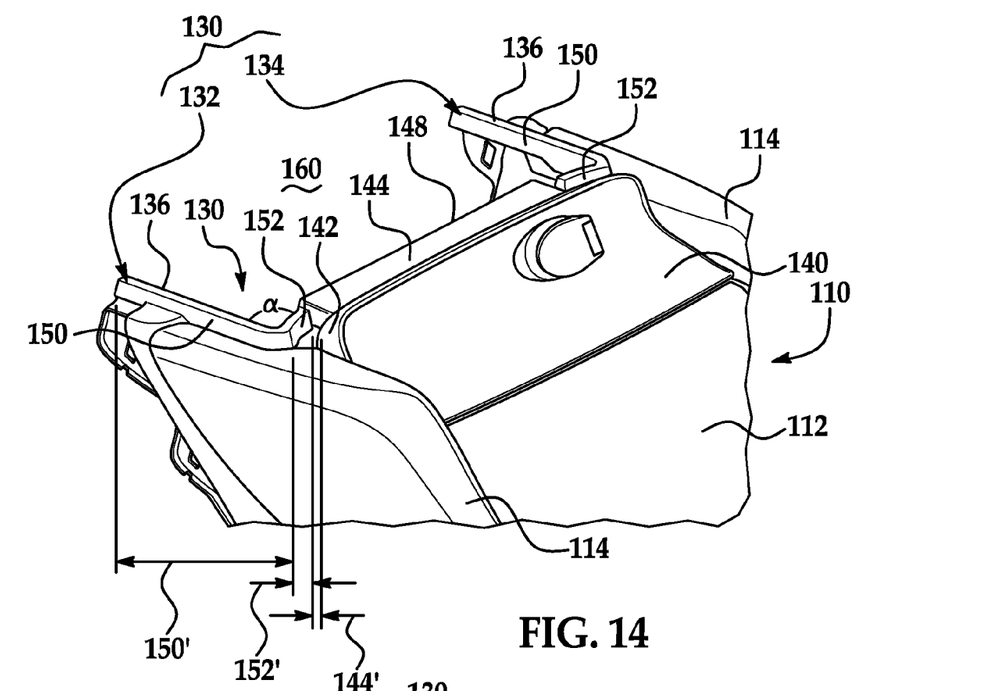
FIG. 14 is a perspective view of a projection of the interior vehicle panel assembly of FIG. 11.

As shown in FIG. 14, each of the first and second sections 132, 134 of the projection 130 has a free distal edge 136 extending at least the height 126 of the first and second sections 122, 124 of the gap 120 such that only the projection 130 is visible through the gap 120. The free distal edges 136 can extend upwards into the cavity 160 on an interior side of the opposing instrument panel walls 106. FIG. 13 is a view from the cavity 160 of the interior panel assembly 100 showing the free distal edges 136 of the first and second sections 132, 134 of the projection 130 extending into the cavity 160. The free distal edges 136 can alternatively extend into a recess such as the recess 64 shown in FIG. 4 on an interior of both of the opposing lateral instrument panel walls 106. The recess 64 can be configured to receive an entire width of one of the first and second sections 132, 134 of the projection 130, or the recess 64 can be configured to receive only a portion of the width of one of the first and second sections 132, 134 of the projection 130, with the remainder of the width extending into the cavity 160. The recess 64 can be disposed on the opposing lateral console walls 114 if the first and second sections 132, 134 extend from the opposing lateral instrument panel walls 106.

The center console wall 112 can comprise a tray panel 140 between opposing lateral console walls 114 and having an interior surface 142 and a rib 144 extending from the interior surface 142. Alternatively, the rib 144 can extend directly from an interior surface of the center console wall 112.

Figure 15:
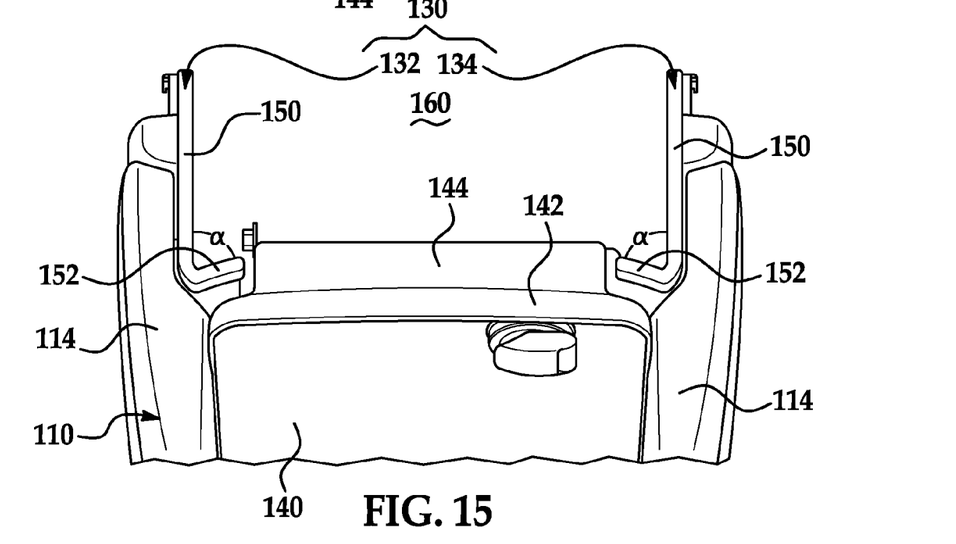
FIG. 15 is a plan view of the projection of FIG. 13.
Figure 16:
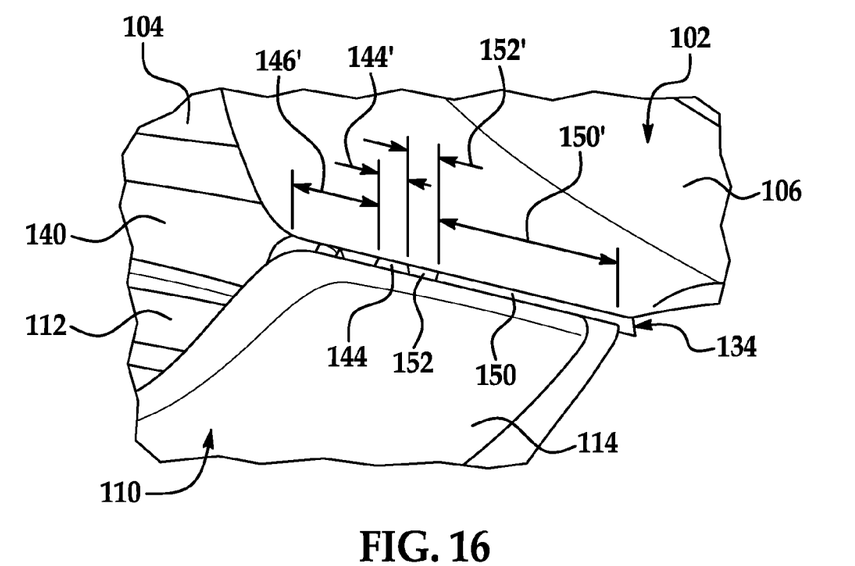
FIG. 16 is an enlarged side view of a portion of the interior vehicle panel assembly of FIG. 11.

As best seen in FIGS. 14-16, each of the first and second sections 132, 134 of the projection 130 can include a first portion 150 extending along a first portion 150' of a length of each of the first and second sections 122, 124 of the gap 120 and a second portion 152 extending at an angle α from the first portion 150 toward the rib 144 of the tray panel 140 or center console wall 112. The angle α shown is illustrative and can be larger or smaller as desired or required. The second portion 152 can extend along respective second portions 152' of each of the first and second sections 122, 124 of the gap 120. The rib 144 extends along a third portion 144' of each of the first and second sections 122, 124 of the gap 120 such that only the first portions 150, the second portions 152, and the rib 144 are visible through the first and second sections 122, 124 of the gap 120.

As best seen in FIG. 16, each of the first and second sections 122, 124 of the gap 120 can have a fourth portion 146' that extends toward the rear of the vehicle 10 from the cavity 160. The fourth portion 146' is not concealed with a portion the first or second sections 132, 134 of projection 130 as the fourth portion 146' extends beyond the face of the tray portion 140 or center console wall 112 so that the passenger compartment 5 is visible through the fourth portion 146' of the gap 120 rather than components within the cavity 160.

Figure 12:
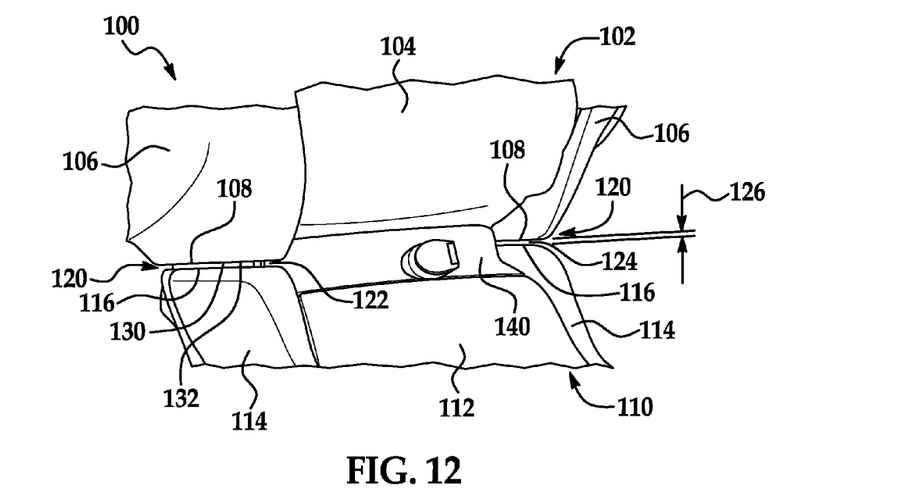
FIG. 12 is an enlarged perspective view of a portion of the interior vehicle panel assembly of FIG. 11.

The rib 144 of the tray panel 140 or center console wall 112 can span the height 126 of each of the first and second sections 122, 124 of the gap 120 or can extend beyond the height 126 as desired or required. An upper edge 148 of the rib 144 can be substantially flush with the distal edges 136 of each of first and second sections 132, 134 of the projection 130, as shown in FIG. 14. FIG. 12 illustrates how the center instrument panel wall 104 extends behind the tray panel 140 or center console wall 112 so that the gap 120 does not continue between them. Because of this, only a portion of the rib 144 is visible through each of the first and second sections 122, 124 of the gap 120. Accordingly, the rib 144 does not have to extend along the length between opposing lateral console walls 114 along the length of the tray panel 140 as shown. The rib 144 also does not have to be a single rib, but can be one or more individual ribs.

Alternatively, as shown in FIG. 13, the center instrument panel wall 104 can have an edge 162 similar to lower edge 108 and the center console wall 112 can have an upper edge 164 (hidden behind rib 144) similar to upper edge 116 to define a third section 166 of the gap 120 there between such that the gap 120 is continuous from the first section 122 through the third section to the second section 124. In such an embodiment, the rib 144 can extend at least a majority of the length of the third section 166 of the gap. The rib 144 could also span at least a height of the third section 166 of the gap 120.

To help achieve a uniform appearance across the first and second sections 122, 124 of the gap 120, a rubber layer such as the rubber layer 96 shown in FIGS. 2 and 5 can overlay the first and second sections 132, 134 of the projection 130 and the rib 144. The rubber layer 96 can be a material other than rubber, such as foam or plastic, and can be a dark uniform color such as black. The rubber layer 96 assists in achieving the appearance of one continuous or integral panel instead of the actual two panel design by visually hiding the gap 120 from view by passengers of the vehicle 10. The rubber layer 96 can also reduce noise due to vibration and contact between the projection 130 and the respective lateral instrument panel wall 106, for example. The same covering material 96 can be used as a console tray mat to cover the tray panel 140 in addition to the rib 144 if a tray panel 140 is incorporated.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An interior panel assembly for a vehicle comprising:
   a first panel having an exterior surface facing a passenger compartment of the vehicle, an interior surface and a first edge, the first panel comprised of a first wall and a second wall extending in a substantially perpendicular plane from the first wall;
   a second panel having an exterior surface facing a passenger compartment of the vehicle, an interior surface and a second edge, the second panel having a first wall and a second wall extending in a substantially perpendicular plane from the first wall, wherein the second edge of the second panel is aligned in a first plane with the first edge of the first panel to define a gap having a height between the first edge of the first panel and the second edge of the second panel; and
   a projection having a first end connected to the interior surface of one of the first and second panels in a second plane parallel to the first plane, the projection having a second end and a height between the first and second ends greater than a span of the gap, the second end configured to be positioned proximate the interior surface of the other of the first and second panels,
   wherein the first wall of the second panel comprises a tray panel having an exterior surface, an interior surface and a rib extending from the interior surface into the gap, the rib extending perpendicular to the projection and spaced from the projection.

2. The interior panel assembly for a vehicle of claim 1, wherein the projection is integrally formed with the one of the first and second panels.

3. The interior panel assembly for a vehicle of claim 1, wherein the first panel is an instrument panel, the first wall of the first panel is a first instrument panel wall and the second wall of the first panel is a second instrument panel wall extending in a substantially perpendicular plane from the first instrument panel wall, the second instrument panel wall having the first edge, and wherein the second panel is a console, the first wall of the second panel is a first console wall and the second wall of the second panel is a second console wall extending in a substantially perpendicular plane from the first console wall, the second console wall having the second edge with the first edge and second edge defining the gap.

4. The interior panel assembly for a vehicle of claim 3, wherein the projection extends from an interior surface of the second console wall.

5. The interior panel assembly for a vehicle of claim 4, wherein the first edge of the second instrument panel wall has a recess extending along the interior surface into which the second end of the projection extends.

6. The interior panel assembly for a vehicle of claim 1, wherein the projection includes a first portion extending along a first portion of a length of the gap and a second portion extending at an angle from the first portion toward the rib of the tray panel, with the second portion extending along a second portion of the gap and the rib extending along a third portion of the gap such that only the first portion, the second portion, and the rib are visible through the gap.

7. The interior panel assembly for a vehicle of claim 1, wherein the first panel is an instrument panel, the second wall of the first panel is a center instrument panel wall, the first wall of the first panel is a first lateral instrument panel wall extending from one side of the center instrument panel wall, the instrument panel further comprising a second lateral instrument panel wall extending from the opposing side of the center instrument panel wall, with the first lateral instrument panel wall having a first portion of the first edge, and the second lateral instrument panel wall having a second portion of the first edge; wherein the second panel is a console, the first wall of the second panel is a center console wall, the second wall of the second panel is a first lateral console wall extending from one side of the center console wall, the console further comprising a second lateral console wall extending from the opposing side of the center console wall, with the first lateral console wall having a first portion of the second edge defining a first section of the gap with the first portion of the first edge, and the second lateral console wall having a second portion of the second edge defining a second section of the gap with the second portion of the first edge.

8. The interior panel assembly for a vehicle of claim 7, wherein the center instrument panel wall has a third portion of the first edge, and the center console wall has a third portion of the second edge, with the third portion of the first and second edges defining a third section of the gap, and the first, second, and third sections of the gap are continuous.

9. The interior panel assembly for a vehicle of claim 7, wherein the projection has a first section extending from an interior surface of one of the first and second lateral console walls and a second section extending from an interior surface of the other of the first and second lateral console walls.

10. The interior panel assembly for a vehicle of claim 9, wherein the tray panel is located between the first and second lateral console walls.

11. The interior panel assembly for a vehicle of claim 10, wherein each of the first section and second section of the projection includes a first portion extending along a corresponding first portion of each of the first and second sections of the gap formed between the corresponding lateral console wall and the lateral instrument panel wall, and a second portion extending at an angle from the first portion toward the rib of the tray panel with the second portion extending along a corresponding second portion of each of the first and second sections of the gap and the rib extending along a corresponding third portion of each of the first and second sections of the gap such that only the first portions of the first and second sections of the projection, the second portions of the first and second sections of the projection, and the rib are visible through the first and second sections of the gap.

12. The interior panel assembly for a vehicle of claim 11, further comprising rubber coverings overlaying the first and second sections of the projection and the rib.

13. The interior panel assembly for a vehicle of claim 1, further comprising a rubber covering that overlays the projection.

14. An interior panel assembly for a vehicle comprising:
an instrument panel having a center instrument panel wall and first and second lateral instrument panel walls extending substantially perpendicular from the center instrument panel wall, the first and second lateral instrument panel walls each having a lower edge surface;
a console having a center console wall and first and second lateral console walls extending substantially perpendicular from the center console wall, the first and second lateral console walls each having an upper edge surface, wherein the upper edge surfaces of the console face the lower edge surfaces of the instrument panel and define a space having a height defined by the lower edge surface and the upper edge surface; and
a projection having a first section extending along the space defined by the first lateral instrument panel wall and the first lateral console wall, and a second section extending along the space defined by the second lateral instrument panel wall and the second lateral console wall, the first and second sections of the projection positioned on a side of the instrument panel and console opposite a passenger compartment and configured be a backdrop to the space wherein the center console wall comprises a tray panel located between the first and second lateral console walls, the tray panel having a rib extending opposite a passenger compartment into the gap and being positioned perpendicular to and between the first section and the second section of the projection.

15. The interior panel assembly of claim 14, wherein the first and second sections of the projection each have a first portion and a second portion, wherein the second portion extends from the first portion at an angle toward the rib of the center console wall such that only the first portions, second portions and rib are visible through the space.

16. The interior panel assembly of claim 14 further comprising a rubber layer overlaying each of the first section, second section and rib.

17. An interior panel assembly for a vehicle comprising:
an instrument panel having an exterior surface facing a passenger compartment of the vehicle, an interior surface and a lower edge surface between the interior and exterior surfaces;
a console having an exterior surface facing a passenger compartment of the vehicle, an interior surface and an upper edge surface between the interior and exterior surfaces, wherein the upper edge surface of the console faces the lower edge surface of the instrument panel to define a gap having a height between the lower edge surface of the instrument panel and the upper edge surface of the console; and
a projection extending from the interior surface of the console proximate the upper edge surface, the projection extending across the height of the gap so that a distal end of the projection is proximate the interior surface of the instrument panel proximate the lower edge surface, the projection comprising first and second sections substantially parallel to each other and a third section extending between and perpendicular to the first and second sections, the third section spaced apart from both the first and second sections.

18. The interior panel assembly for a vehicle of claim 17, wherein the projection is integrally formed with the console panel.

19. The interior panel assembly for a vehicle of claim 17, wherein the projection has no contact with the upper edge surface and the lower edge surface.

20. The interior panel assembly for a vehicle of claim 17, wherein the console comprises a console wall and a tray panel extending from the console wall, wherein the third section of the projection extends from an interior surface into the gap along a width of the tray panel.

21. The interior panel assembly for a vehicle of claim 20, wherein the projection is configured such that only the projection is visible through the gap.

* * * * *